(12) United States Patent
Turner (10) Patent No.: US 9,785,775 B1
(45) Date of Patent: Oct. 10, 2017

(54) MALWARE MANAGEMENT

(71) Applicant: Symantec Corporation, Mountain View, CA (US)

(72) Inventor: George R. Turner, Yorktown, VA (US)

(73) Assignee: Symantec Corporation, Mountain View, CA (US)

( * ) Notice: Subject to any disclaimer, the term of this patent is extended or adjusted under 35 U.S.C. 154(b) by 33 days.

(21) Appl. No.: 14/486,922

(22) Filed: Sep. 15, 2014

(51) Int. Cl.
*G06F 21/00* (2013.01)
*G06F 21/56* (2013.01)
*H04L 29/06* (2006.01)

(52) U.S. Cl.
CPC ...... *G06F 21/566* (2013.01); *G06F 2221/033* (2013.01); *H04L 63/145* (2013.01)

(58) Field of Classification Search
CPC ...... G06F 21/56; G06F 21/564; G06F 21/566; H04L 63/145; H04L 63/1433
See application file for complete search history.

(56) References Cited

U.S. PATENT DOCUMENTS

| | | | | |
|---|---|---|---|---|
| 7,941,850 B1* | 5/2011 | Satish | ............ | G06F 21/554 726/22 |
| 8,104,090 B1* | 1/2012 | Pavlyushchik | ........ | G06F 21/55 713/188 |
| 2005/0248457 A1* | 11/2005 | Himberger | ............ | G06F 21/552 340/541 |
| 2007/0028304 A1* | 2/2007 | Brennan | ............... | G06F 21/55 726/24 |
| 2007/0150956 A1* | 6/2007 | Sharma | ............... | G06F 21/554 726/24 |
| 2012/0310850 A1* | 12/2012 | Zeng | ............... | G06N 5/02 705/317 |
| 2013/0060783 A1* | 3/2013 | Baum | ............... | G06F 17/30551 707/746 |
| 2013/0160124 A1* | 6/2013 | St Hlberg | ............ | G06F 21/554 726/24 |
| 2013/0305365 A1* | 11/2013 | Rubin | ............ | G06F 21/552 726/23 |
| 2014/0351810 A1* | 11/2014 | Pratt | ............ | G06F 9/45545 718/1 |

OTHER PUBLICATIONS

Xu Chen et al., Towards an Understanding of Anti-virtualization and Anti-debugging Behavior in Modern Malware, Jun. 24-27, 2008, IEEE, pp. 177-186.*
Naomi Fujimura et al., Implementation of File Interpolation Detection System, Oct. 7-10, 2007, ACM, pp. 118-121.*
Ulrich Bayer et al., Improving the Efficiency of Dynamic Malware Analysis, Mar. 22-26, 2010, ACM, pp. 1871-1878.*
Tobias Wüchner et al., Malware Detection with Quantitative Data Flow Graphs, Jun. 4-6, 2014, ACM, pp. 271-282.*

* cited by examiner

*Primary Examiner* — Luu Pham
*Assistant Examiner* — Fahimeh Mohammadi
(74) *Attorney, Agent, or Firm* — Holland & Hart LLP (57) ABSTRACT

According to at least one embodiment, a computer-implemented method for managing malware for a computing device is described. In one embodiment, an attempt by a process to modify at least one file on the computing device may be identified. The identified process may be analyzed to estimate an age value associated with the identified process. The estimated age value of the identified process may be compared to an age value associated with the at least one file. The attempt to modify the at least one file may be prevented based at least in part on the comparison.

18 Claims, 5 Drawing Sheets

MALWARE MANAGEMENT

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand an increase in the efficiency of these technologies. Improving the efficiency of computer technologies may be desirable to anyone who uses and relies on computers.

With the wide-spread of computers and mobile devices has come an increased presence of malicious software or malware. Malware is any software used to disrupt computer operation, gather sensitive information, or gain access to private computer systems. Malware may result in brief user annoyance to complete computer hijacking and, in some instances, identity theft.

SUMMARY

According to at least one embodiment, a computer-implemented method for managing malware for a computing device is described. In one embodiment, an attempt by a process to modify at least one file on the computing device may be identified. The identified process may be analyzed to estimate an age value associated with the identified process. The estimated age value of the identified process may be compared to an age value associated with the at least one file. The attempt to modify the at least one file may be prevented based at least in part on the comparison.

In one embodiment, preventing the attempt to modify the at least one file may comprise preventing the process from writing a modified file to the computing device. In other embodiments, it may be determined if the process is newer than the at least one file. The attempt to modify the at least one file may be prevented based additionally on the determining.

In further embodiments, identifying an attempt to modify at least one file may further comprise identifying a sub-process within the process attempting to modify the at least one file. The age value associated with the sub-process may be estimated based at least in part on the identifying. The sub-process may be extracted from the process if the age value associated with the sub-process is newer than the age value associated with the at least one file. The sub-process may be quarantined based at least in part on the extraction. The at least one file may comprise a critical resource. The critical resource may be an operating system of the computing device.

In some embodiments, the process may be quarantined based at least in part on the prevention. Input may be received to allow the identified process to modify the file. The process may be released from quarantine based at least in part on the received input. A user of the computing device may be notified that the process is attempting to modify the at least one file on the computing device. Input may be received to allow the process to modify the at least one file based at least in part on the notification. The age value of the identified process may be calculated based at least in part on a time the process was identified when an actual age value of the identified process is unknown.

In some embodiments, analyzing the process may further comprise determining whether the identified process comprises a digital signature. Upon determining the identified process comprises the digital signature, the identified process may be allowed to modify the at least one filed based at least in part on the digital signature.

A computing device configured to manage malware for a computing device is also described. The device may include a processor and memory in electronic communication with the processor. The memory may store instructions that are executable by the processor to identify an attempt by a processor to modify at least one file on the computing device. The instructions executable by the process may analyze the identified process to estimate an age value associated with the identified process and compare the estimated age value of the identified process to an age value associated with the at least one file. The instructions executable by the processor may prevent the attempt to modify the at least one file based at least in part on the comparison.

A computer-program product to manage malware for a computing device is also described. The computer-program product may include a non-transitory computer-readable medium that stores instructions. The instructions may be executable by a processor to identify an attempt by a process to modify at least one file on the computing device. The instructions executable by the processor may analyze the identified process to estimate an age value associated with the identified process and compare the estimated age value of the identified process to an age value associated with the at least one file. The instructions executable by the processor may prevent the attempt to modify the at least one file based at least in part on the comparison.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to managing malware. More specifically, the systems and methods described herein relate to managing malware such as to prevent malware from infiltrating a computing device. Managing malware may prevent unwanted, undesirable, or negative impacts on a computing device. Malware may comprise computer viruses, worms, spyware, adware, Trojan horses, ransomware, rootkits, adware, scareware, and the like. Malware may allow unauthorized access to personal information by logging keystrokes or monitoring the activity on the computing device. Malware may also hijack a user's data and only release the data to the user upon payment of a fee. In some embodiments, an anti-virus or other protection system may be unable to prevent malware from accessing a machine because the protection system may not have knowledge of the malware.

Figure 1:
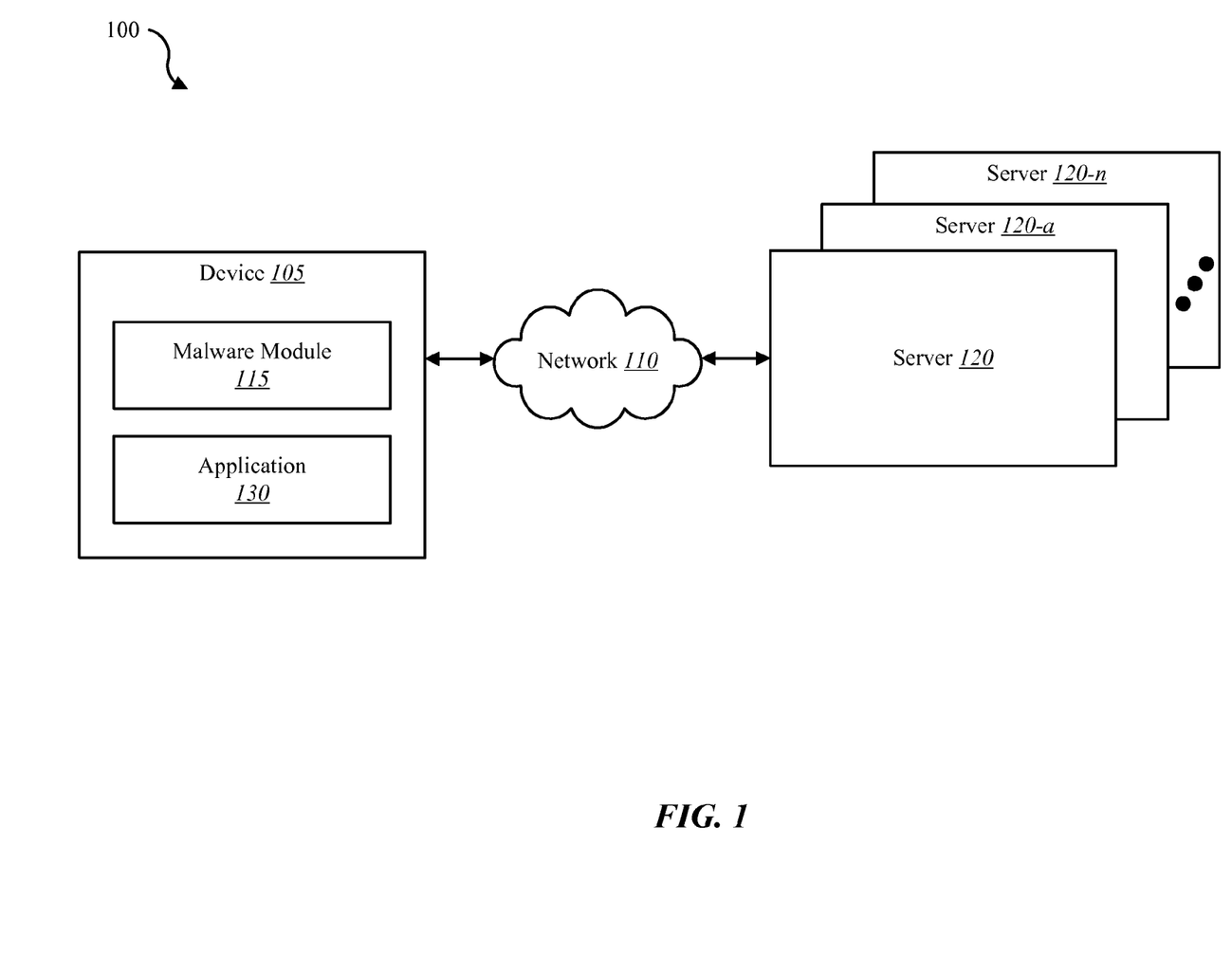
FIG. 1 is a block diagram illustrating an exemplary embodiment of an environment in which the present systems and methods may be implemented.

FIG. 1 is a block diagram illustrating one embodiment of an environment 100 in which the present systems and methods may be implemented. The environment may include a device 105, a server 120, and a network 110. In some embodiments, the systems and methods described herein may be performed on the device 105 or on the device 105 and the server 120. In some embodiments, the environment 100 may include multiple servers 120, 120-a, 120-n.

The device 105 may include one or more processors, one or more memory devices, and/or a storage device. Examples of the device 105 may include mobile phones, smart phones, tablets, personal digital assistants (PDAs), wearable computers, ultra-mobile PCs, a viewing device associated with a media content set top box, satellite set top box, cable set top box, DVRs, personal video recorders (PVRs), personal computing devices, computers, servers, etc. Additionally, the device 105 may represent a single device or multiple devices that may access the server 120.

In some embodiments, the device 105 may include a malware module 115 and an application 130. The malware module 115 may manage malware. For example, the malware module 115 may prevent unauthorized processes from modifying and/or accessing at least one file on the device 105. Unauthorized processes may include various forms of malware or other malicious programs or processes.

The application 130 may interface with the malware module 115 and the server 120 via the network 110. Examples of the application 130 may include any combination of a program installed on a server, a program installed on a personal computer, a mobile application installed on a mobile computing device, a web browser, a web-based application (e.g., any combination of JavaScript, hypertext markup language (HTML), and cascading style sheets (CSS)), etc. The web browser may be a software application for retrieving, presenting, and/or traversing information over the network 110. In some embodiments, the web browser may construct files. Examples of a web browser include Firefox, Internet Explorer, Google Chrome, Opera, Safari and the like. In some embodiments, the application 130 may be installed on the device 105 to enable a user of the device 105 to interface with a function of server 120.

The server 120 may serve one or more privileged services. For example, the server 120 may be one of an application server, catalog server, database server, content delivery network, proxy server, web server, or the like. In some embodiments, multiple servers 120, 120-a, 120-n may be present. The multiple servers 120-n may comprise a variety of types of servers. For example, the environment 100 may comprise at least a content delivery network, a web server, and an application server. A content delivery network may be a distributed system of servers in multiple data centers across the internet. The content delivery network may provide high availability and high performance of content to users.

In some cases, the device 105 may connect to the server 120 via the network 110. Examples of the network 110 include any combination of local area networks (LAN), wide area networks (WAN), virtual private networks (VPN), wireless networks (using 802.11, for example), cellular networks (using 3G and/or LTE, for example), etc. In some configurations, the network 110 may include the internet. Thus, network 110 may include one or more gateway devices, access points, routers, switches, dynamic host configuration protocol (DHCP) servers, etc., that enable computing devices to connect to the internet.

Figure 2:
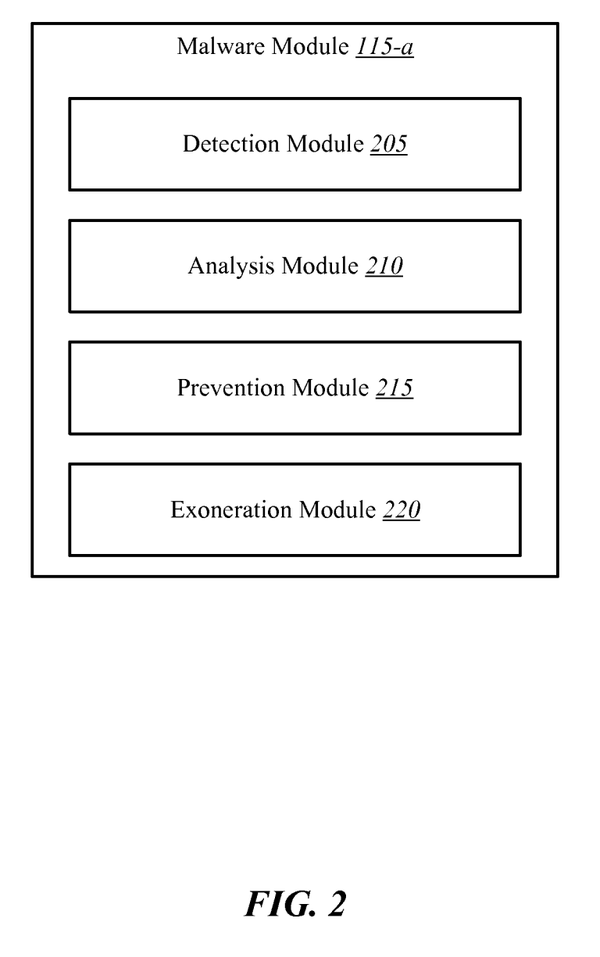
FIG. 2 is a block diagram illustrating one example of a malware module.

FIG. 2 is a block diagram illustrating one example of a malware module 115-a. The malware module 115-a may be one example of the malware module 115 depicted in FIG. 1. As depicted, the malware module 115-a may include a detection module 205, an analysis module 210, a prevention module 215, and an exoneration module 220. The malware module 115-a may include additional or fewer modules and capabilities in other embodiments. The malware module 115-a may manage malware on a user's computing device (e.g. device 105).

In one embodiment, the detection module 205 may identify an attempt by a process to modify at least one file on a computing device. For example, a computing device may comprise a memory which may store one or more files. The files may be created or downloaded by the user. In some embodiments, the file may comprise a critical resource. The critical resource may comprise an operating system of the computing device. In some instances, a process may access at least one file. The process may access the file to modify it. In some embodiments, the process may be a form of malware.

The malware may comprise a form of ransomware. A ransomware process may access one or more files on a computing device and hold files ransom. For example, the ransomware process may access at least one file and encrypt the file. Once the file is encrypted, the user may not access, view, and/or modify the file without decrypting it. However, the user may not have the proper decryption key. Therefore, the user may pay a ransom, or monetary fee, to the developer/owner of the ransomware. The ransomware process may decrypt the at least one file upon receipt of the fee. In some instances, the ransomware may block a user from accessing their computing device until a monetary fee is received. For example, the ransomware may have accessed a critical resource of the computing device and modified it such that the user may be prevented from accessing their device.

In some embodiments, the detection module 205 may comprise a flow of file access. The detection module 205 may track processes on a computing device. As part of the tracking, the detection module 205 may track when a process accesses a file. The process may be an executable (e.g. an executable file or an executable program). The executable may cause the computing device to perform indicated tasks according to instructions contained with the executable.

In some embodiments, the detection module 205 may detect independent processes and/or sub-process. For example, processes may be downloaded and run completely separate from other programs and/or applications which may be present on a computing device. In other embodiments, a program and/or application may run several processes at once. For example, a web browser may access a web site which may run one or more hidden processes. However, the detection module 205 may discover grouped processes or individual sub-processes. In some embodiments, the sub-process may attempt to access and/or modify a file.

In further embodiments, the detection module 205 may scrutinize processes and/or applications differently. For example, some processes or applications may be less threatening or have a lower history of intrusive and/or offensive processes. For example, malware may not typically be implemented from a word processing document. Therefore, processes and sub-processes within the word processing document may not require a high level of scrutiny. In contrast, other applications and/or processes may have a higher risk level. For example, web browsers are known entities for proliferating malware. Therefore, processes associated with web browsers may be heavily scrutinized.

The analysis module 210 may analyze the identified process to determine if the process is a form of malware. For example, the detection module 205 may communicate and/or send the detected process to the analysis module 210 for further evaluation to determine if the identified process may be a form of malware or other undesirable process on a computing device. In some embodiments, the analysis module 210 may determine an estimated age value associated with the identified process.

In one embodiment, the estimated age value of a process may be equivalent to when the process was downloaded to the computing device. In other embodiments, the age of the process may be when the sub-process accessed the computing device or was downloaded to the computing device. In some embodiments, an age value of a process may be unidentifiable. For example, the process may run through another program or may be a complicated malware process capable of concealing its age value or download time stamp. In such instances, the analysis module 210 may calculate and/or assume the age value of the process to be the time the process was identified and/or detected.

Once an age value of the identified process is determined, the age value of the identified process may be compared to an age value of the at least one file the identified process was attempting to access and/or modify. If the age value of the identified process is newer, or younger than, the age value of the at least one file, the analysis module 210 may flag the prevention module 215 to prevent the identified file from accessing and/or writing to the file.

In some embodiments, the analysis module 210 may determine if the process comprises a digital signature. The digital signature may demonstrate the authenticity of a process. The digital signature may provide the recipient with the knowledge that the process was created by a known and trusted entity or organization and that the read/write process is acceptable and not purposefully detrimental to the computing device. The digital signature may comprise one or more algorithms which may be infeasible to generate without knowing the public key cryptography. If the analysis module 210 positively identifies the digital signature within the process or associated with the process, the analysis module 210 may allow the process to continue its function.

The prevention module 215 may prevent a process from running based at least in part on information supplied and/or discovered by the analysis module 210. The prevention module 215 may stop the process from accessing or modifying the at least one file. The prevention module 215 may prohibit the process from accessing and/or modifying any other files on the computing device. For example, if the age value of the process is newer than the at least one file the identified process is attempting to modify, the prevention module 215 may block the process from modifying the file. The identified process may be an independent process or may be a sub-process.

In some embodiments, the prevention module 215 may quarantine the process. If the process is a sub-process the entire process may be quarantined or the sub-process may be extracted from the larger process and separately quarantined. Quarantining the process may comprise isolating the process in a folder on the computing device, stripping the process of its rights, and/or otherwise preventing the process from executing. The quarantine folder may be a folder that cannot be easily accessed by regular file management utilities.

Once a process is quarantined, information regarding the process may be recorded. For example, the prevention module 215 may track when the process was quarantined, where the process originated from, the type of file, the date the file was quarantined and the like. The prevention module 215 may eventually generate a database of potential malware which may prevent the malware from proliferating.

The exoneration module 220 may allow the process to access and/or modify the at least one file. For example, the exoneration module 220 may alert a user that a process has been quarantined or otherwise isolated. The user may be unaware the process was running or have no knowledge of the process and approve the corrective action. In other instances, the process may be known to the user and the user may wish for the process to continue its execution. Therefore, the user may request the release and/or allowance of the process to continue its execution. If the process has been quarantined, the exoneration module 220 may restore the process to its original location with its original privileges to read and write to one or more files.

In some embodiments, the exoneration module 220 may alert the user when the detection module 205 has determined a process is attempting to modify a file prior to quarantining the process. Again, the user may request the process to not access the file or may request the process to continue processing the file. For example, the file may be downloaded from a web browser but may be downloaded from a trusted source or corporation. Therefore, the user may desire the process to continue accessing the at least one file.

Figure 3:
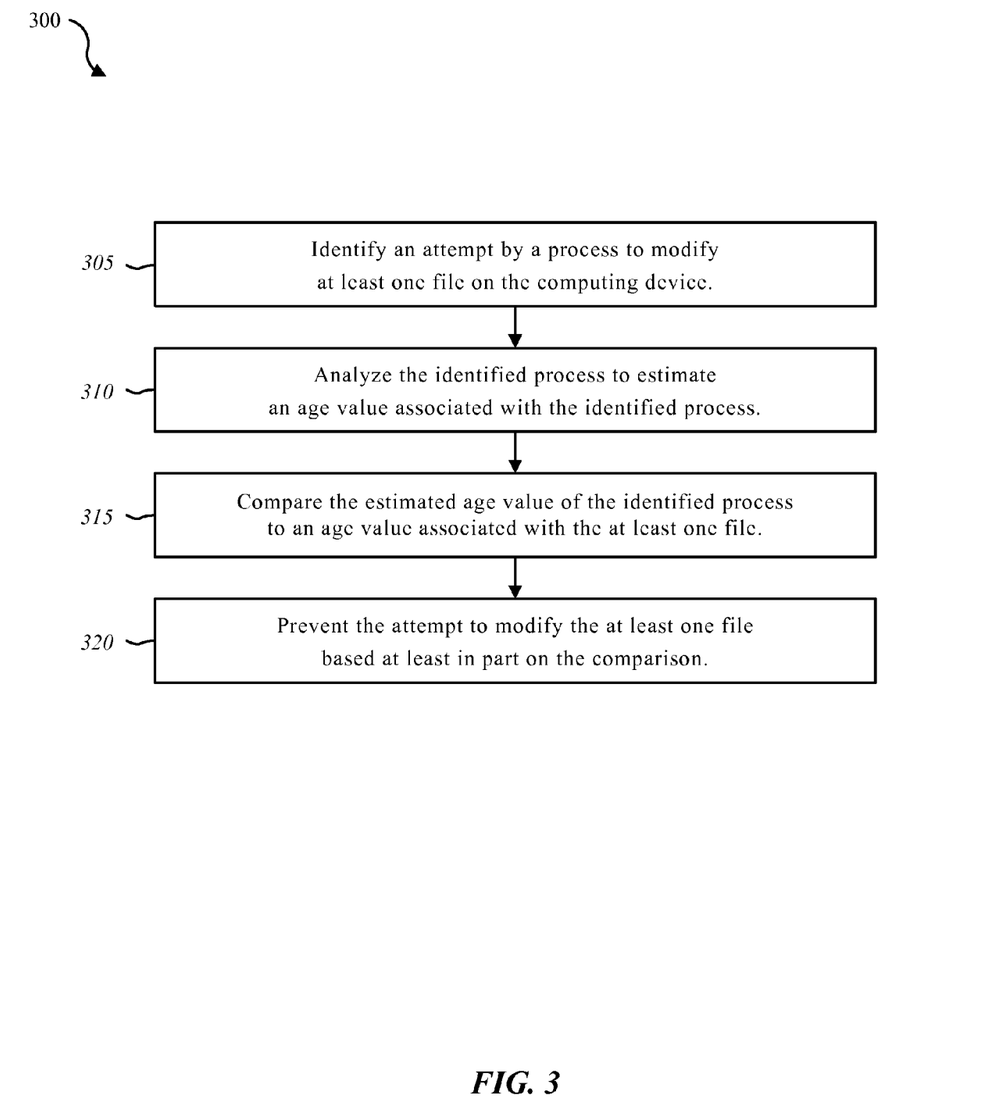
FIG. 3 is a flow diagram illustrating one embodiment of an exemplary method for managing malware.

FIG. 3 is a flow diagram illustrating one embodiment of a method 300 for managing malware. In some configurations, the method 300 may be implemented by the malware module 115 illustrated in FIGS. 1 and/or 2.

At block 305, an attempt by a process to modify at least one file on the computing device may be identified. The process may have accessed a file and may be attempting to modify the file. The modification may be changing the file formatting. For example, a word processing document may be converted to a joint photographic experts group (jpeg) file. In other embodiments, the modification of the file may alter the contents of the file. For example, the process may attempt to encrypt or otherwise block a user's ability to access the file. The user may not access, read, or the otherwise view the file. In some instances, the user may require the decryption key to return the at least one file back to its original state. If the process is run by a malware program, the user may pay a monetary sum to retrieve the decryption key or to trigger the process to decrypt the at least one file.

In some embodiments, the process may be part of a larger process. For example, the larger process may be an application running on the computing device, such as a web browser. The identified process may be a sub-process of the larger process. In the web browser example, the sub-process may be a multimedia platform software running within the web browser. The sub-process may be a smaller component of the multimedia software. In some embodiments, malware may be essentially hidden or undetectable to a user within the larger processes.

At block 310, the identified process may be analyzed to estimate an age value associated with the identified process. The age value may be calculated using an origination time stamp, a download time stamp, an access time stamp, or the like. The age value may be calculated using a time stamp and a time value of when the process was identified. In some embodiments, the age value of the process may be unidentifiable. For example, the age value may be undetectable, hidden within a larger process, or the like. In some embodiments, the process may not be installed on the computing device but may run through another avenue. For example, the process may execute from a web browser. If the age value of the process is unidentifiable, the age value of the process may be assumed to be zero.

At block 315, the estimated age value of the identified process may be compared to an age value of the at least one file. The age value of the file may be based at least in part on one of a creation time value, a download time value, a modified time value, or the like. In some embodiments, the age value of the file may vary depending on the time value used to calculate the age value. In some instances, different age values may be calculated and the oldest age value may be used in the comparison.

At block 320, the attempt by the identified process to modify the at least one file may be prevented based at least in part on the comparing. For example, malware may be recently installed or recently accessed a computing device. Therefore, if a newer process attempting to access and modify older files may be malware. The attempt by the identified process to the modify the at least one file may be prevented in order to cease a potential malware attack.

Figure 4:
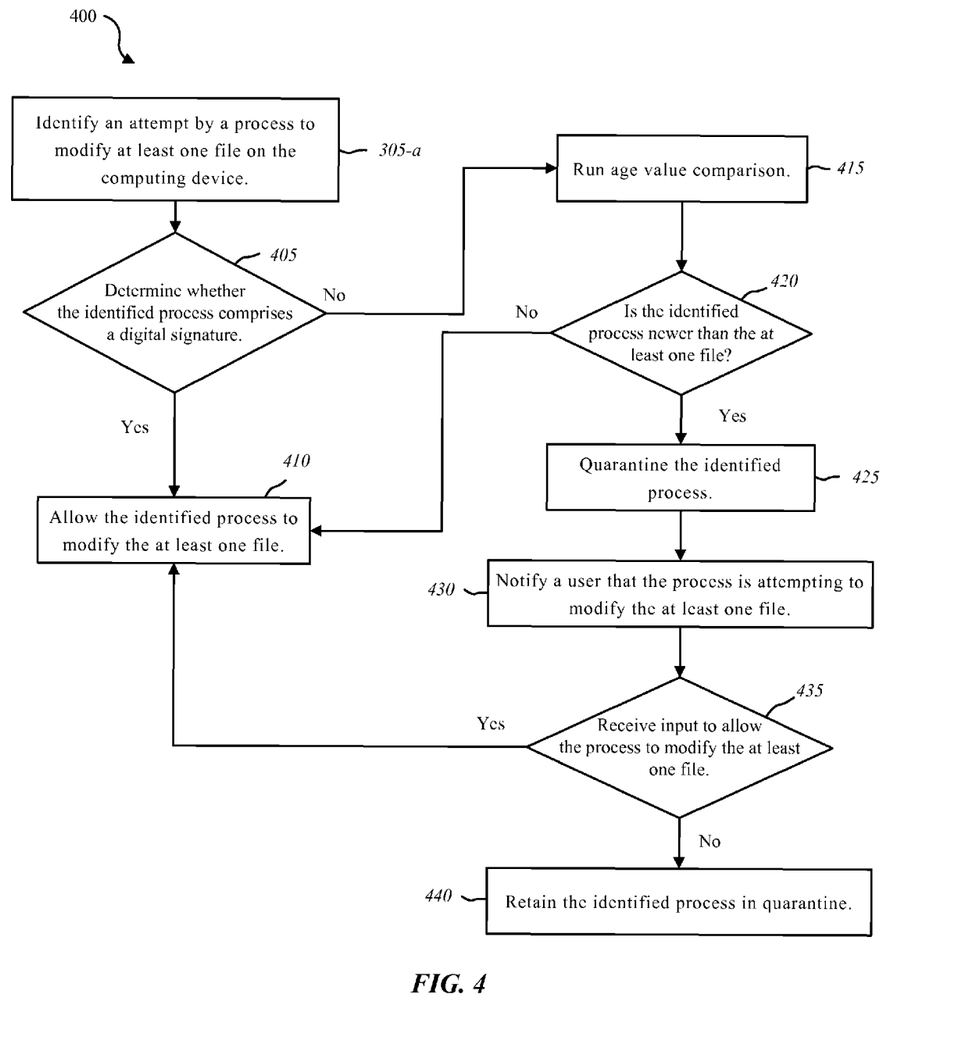
FIG. 4 is a flow diagram illustrating another embodiment of an exemplary method for managing malware.

FIG. 4 is a flow diagram illustrating one embodiment of a method 400 for managing a generic software package. In some configurations, the method 400 may be implemented by the malware module 115 illustrated in FIGS. 1 and/or 2.

At block 305-a, an attempt by a process to modify at least one file on a computing device may be identified. At block 405, it is determined whether or not the identified process comprises a digital signature. A digital signature may be embedded within the process. The digital signature may identify a trustworthy source of the process. If the identified process comprises a digital signature, at block 410, the identified process may be allowed to modify the at least one file.

If, at block 405, the identified process does not comprise a digital signature, or the digital signature is not trustworthy, at block 415, an age value comparison may be performed. An age value comparison may be similar to the method disclosed in relation to FIG. 3. At block 420, if the identified process is not newer than the at least one file, at block 410, the identified process may be allowed to modify the at least one file.

If the identified process is new than the at least one, at block 425, the identified process may be quarantined. For example, the identified process may be sequestered into a location on the computing device that is not easily accessible. The identified process may be blocked from accessing or modifying any other files on the computing device. The identified process may also be prevented from disseminating further. For example, if the process is malware, the malware may attempt to spread to other computing devices through various means. Quarantining or isolating the identified process may prevent the dissemination of the process.

At block 430, a user may be notified that the identified process is attempting to modify at least one file. The notification may comprise a request for feedback from the user. The user may maintain the process in quarantine or release the process from quarantine. For example, the user may have knowingly downloaded a file from a web browser. The file may comprise a number of items. In some instances, the file may be a digital photograph editing program. Therefore, the program may attempt to access and modify digital photography files. The user may have knowledge of the process and request read/write access for the process. In other embodiments, a process may infiltrate the computing device and attempt to access and/or modify files without the user's knowledge.

If, at block 435, input is positively received to allow the process to modify the at least one file, at block 410, the process may modify the file. However, if the user is unaware of the process, at block 435, the user may request the process be denied read/write access. Therefore, at block, 440, the identified process may remain in quarantine. In some embodiments, processes that remain in quarantine may be reported. For example, the user may be utilizing a malware prevention system. The user may report the process to the malware prevention system. Other means of reporting suspicious processes may also be utilized. In some embodiments, the user may have the option to release a quarantined process.

Figure 5:
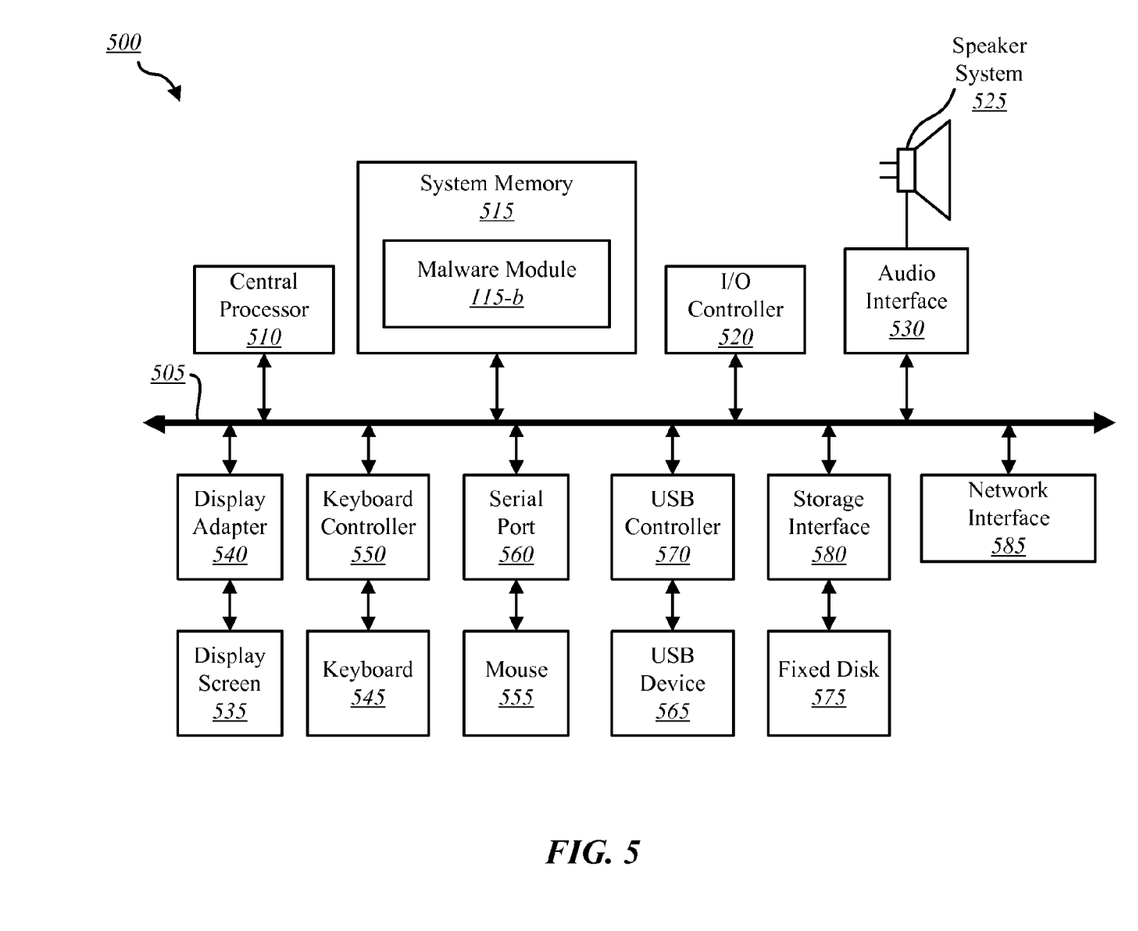
FIG. 5 depicts a block diagram of a computer system suitable for implementing the present systems and methods.

FIG. 5 depicts a block diagram of a computer system 500 suitable for implementing the present systems and methods. Computer system 500 includes a bus 505 which interconnects major subsystems of computer system 500, such as a central processor 510, a system memory 515 (typically RAM, but which may also include ROM, flash RAM, or the like), an input/output controller 520, an external audio device, such as a speaker system 525 via an audio output interface 530, an external device, such as a display screen 535 via display adapter 540, a keyboard 545 (interfaced with a keyboard controller 550) (or other input device), multiple USB devices 565 (interfaced with a USB controller 570), and a storage interface 580. Also included are a mouse 555 (or other point-and-click device) connected to bus 505 through serial port 560 and a network interface 585 (coupled directly to bus 505).

Bus 505 allows data communication between central processor 510 and system memory 515, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the malware module 115-*b* may be stored within the system memory 515. Applications resident with computer system 500 are generally stored on and accessed via a non-transitory computer readable medium, such as a hard disk drive (e.g., fixed disk 575) or other storage medium. Additionally, applications can be in the form of electronic signals modulated in accordance with the application and data communication technology when accessed via interface 585.

Storage interface 580, as with the other storage interfaces of computer system 500, can connect to a standard computer readable medium for storage and/or retrieval of information, such as a fixed disk drive 575. Fixed disk drive 575 may be a part of computer system 500 or may be separate and accessed through other interface systems. Network interface 585 may provide a direct connection to a remote server via a direct network link to the Internet via a POP (point of presence). Network interface 585 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 5 need not be present to practice the present systems and methods. The devices and subsystems can be interconnected in different ways from that shown in FIG. 5. The operation of a computer system such as that shown in FIG. 5 is readily known in the art and is not discussed in detail in this application. Code to implement the present disclosure can be stored in a non-transitory computer-readable medium such as one or more of system memory 515 or fixed disk 575. The operating system provided on computer system 500 may be iOS®, MS-DOS®, MSWINDOWS®, OS/2®, UNIX®, LINUX®, or another known operating system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for managing malware for a computing device, comprising:
identifying, via one or more processors, an attempt by a process to modify a file on the computing device;
determining, via the one or more processors, whether the process comprises a digital signature;
analyzing, via the one or more processors, the process to estimate an age value associated with the process based at least in part on determining that the process does not comprise a digital signature;
comparing, via the one or more processors, the estimated age value of the process to an age value associated with the file based at least in part on the analyzing, wherein the estimated age value of the process comprises at least one of an origination timestamp, a download timestamp, and an access time stamp, or any combination thereof, and wherein the age value associated with the file comprises at least one of a creation time value, a download time value, and a modified time value, or any combination thereof;
determining, via the one or more processors, whether the process is newer than the file based at least in part on the comparing;
quarantining, via the one or more processors, the process to prevent modification of any other file on the computing device to improve a protection ability of the computing device based at least in part on determining that the process is newer than the file;
notifying, via the one or more processors, a user of the computing device that the process is attempting to modify the file on the computing device based at least in part on the quarantining;
allowing, via the one or more processors, the process to modify the file based at least in part on the process comprising the digital signature, the process not being newer than the file, or receiving feedback based at least in part on the notifying, or a combination thereof; and
retaining, via the one or more processors, the process in quarantine based at least in part on the process comprising the digital signature, the process not being newer than the file, or receiving feedback based at least in part on the notifying, or a combination thereof.

2. The method of claim 1, further comprises:
preventing the process from writing a modified file to the computing device.

3. The method of claim 1, further comprising:
determining whether an estimated age value of the process is identifiable based on the analyzing;
determining the estimated age value of the process based on the analyzing, when the estimated age value of the process is identifiable; and
assigning a default age value to the estimated age value of the process, when the estimated age value of the process is unidentifiable.

4. The method of claim 1, further comprises:
preventing the attempt to modify the file based at least in part on the comparing.

5. The method of claim 1, wherein identifying an attempt to modify at least one file further comprises:
identifying a sub-process within the process attempting to modify at least one file;
estimating an age value associated with the sub-process based at least in part on the identifying;
comparing the estimated age value associated with the sub-process to an age value associated with the file;
extracting the sub-process from the process when the age value associated with the sub-process is newer than the age value associated with the file; and
quarantining the sub-process based on the extracting.

6. The method of claim 1, wherein the file comprises a critical resource.

7. The method of claim 6, wherein the critical resource is an operating system of the computing device.

8. The method of claim 1, furthering comprising:
releasing the process from quarantine based at least in part on the received feedback.

9. The method of claim 1, wherein receiving the feedback further comprises:
receiving input to allow the process to modify the file based at least in part on the notification.

10. The method of claim 1, further comprising
calculating the age value of the process based at least in part on a time the process was identified when an actual age value of the process is unknown.

11. The method of claim 1, wherein the default age value comprises a time associated with the identified attempt by the process to modify the file, and wherein the process is unidentifiable when the process is concealing an age value or download time stamp.

12. A computing device configured to manage malware, comprising:
one or more processors;
a memory in electronic communication with the one or more processors;
an instructions stored in the memory, the instructions being executable by the one or more processors to:
identify an attempt by a process to modify a file on the computing device;
determine whether the process comprises a digital signature;
analyze the process to estimate an age value associated with the process based at least in part on determining that the process does not comprise a digital signature;
compare the estimated age value of the process to an age value associated with the file based at least in part on the analyzing, wherein the estimated age value of the process comprises at least one of an origination timestamp, a download timestamp, and an access time stamp, or any combination thereof, and wherein the age value associated with the file comprises at least one of a creation time value, a download time value, and a modified time value, or any combination thereof;
determine whether the process is newer than the file based at least in part on the comparing;
quarantine the process to prevent modification of any other file on the computing device to improve a protection ability of the computing device based at least in part on determining that the process is newer than the file;
notify a user of the computing device that the process is attempting to modify the file on the computing device based at least in part on the quarantine;
allow the process to modify the file based at least in part on the process comprising the digital signature, the process not being newer than the file, or receiving feedback based at least in part on the notifying, or a combination thereof; and
retain the process in quarantine based at least in part on the process comprising the digital signature, the process not being newer than the file, or receiving feedback based at least in part on the notifying, or a combination thereof.

13. The computing device of claim 12, wherein the instructions are executable by the one or more processors to:
prevent the process from writing a modified file to the computing device.

14. The computing device of claim 12, wherein the instructions are executable by the one or more processors to:
determine whether the process is newer than the file based on the estimated age value of the process and the age value associated with the file
determine whether an estimated age value of the process is identifiable based on the analyzing;
determine the estimated age value of the process based on the analyzing, when the estimated age value of the process is identifiable; and
assign a default age value to the estimated age value of the process, when the estimated age value of the process is unidentifiable.

15. The computing device of claim 12, wherein the instructions are executable by the one or more processors to:
prevent the attempt to modify the file based at least in part on the comparing.

16. A non-transitory computer-readable medium storing instructions thereon, the instructions being executable by one or more processors to:
identify an attempt by a process to modify a file on a computing device;
determine whether the process comprises a digital signature;
analyze the process to estimate an age value associated with the process based at least in part on determining that the process does not comprise a digital signature;
compare the estimated age value of the process to an age value associated with the file based at least in part on the analyzing, wherein the estimated age value of the process comprises at least one of an origination timestamp, a download timestamp, and an access time stamp, or any combination thereof, and wherein the age value associated with the file comprises at least one of a creation time value, a download time value, and a modified time value, or any combination thereof;
determine whether the process is newer than the file based at least in part on the comparing;
quarantine the process to prevent modification of any other file on the computing device to improve a protection ability of the computing device based at least in part on determining that the process is newer than the file;

notify a user of the computing device that the process is attempting to modify the file on the computing device based at least in part on the quarantine;

allow the process to modify the file based at least in part on the process comprising the digital signature, the process not being newer than the file, or receiving feedback based at least in part on the notifying, or a combination thereof; and retain the process in quarantine based at least in part on the process comprising the digital signature, the process not being newer than the file, or receiving feedback based at least in part on the notifying, or a combination thereof.

17. The non-transitory computer-readable medium of claim 16, wherein the instructions are executable by the one or more processors to:

prevent the process from writing a modified file to the computing device.

18. The non-transitory computer-readable medium of claim 16, wherein the instructions are executable by the one or more processors to:

determine whether an estimated age value of the process is identifiable based on the analyzing;

determine the estimated age value of the process based on the analyzing, when the estimated age value of the process is identifiable;

assign a default age value to the estimated age value of the process, when the estimated age value of the process is unidentifiable.

\* \* \* \* \*